March 19, 1963  K. A. HUBOI ET AL  3,081,643
CHAIN TIGHTENER
Filed Dec. 15, 1961

INVENTORS
Karl August Huboi,
Helmut Eicker &
Erich Bonn
BY
C. W. Christen
Attorney 3,081,643
CHAIN TIGHTENER
Carl August Huboi, Hofheim, Taunus, and Helmut Eicker and Erich Bonn, Russelsheim (Main), Germany, assignors to General Motors Corporation, Detroit, Mich., a corporation of Delaware
Filed Dec. 15, 1961, Ser. No. 161,332
Claims priority, application Germany Dec. 22, 1960
11 Claims. (Cl. 74—242.11)

This invention relates to a tightener for drive chains or belts.

An object of the invention is to provide a chain tightener which occupies little space, is simple in construction and reliable in operation.

Another object of the invention is to provide a chain tightener, the principal components of which are in the form of sheet metal stampings.

A chain tightener according to the invention consists of two sheet-metal stamped portions of which one portion forming a guide bar, is stationary and the other portion forming the tension member is guided after the manner of a slide on the first one, the displacement of the tension member in one direction being prevented by a one-way locking mechanism, but is made possible in the other direction by the force of a spring arranged between the two portions.

A further feature of the invention resides in the fact that the locking device comprises two sets of locking teeth, which are staggered with respect to each other by the distance of half a tooth and are respectively engaged by a pair of spring pawls.

Due to the construction of the device from sheet-metal stampings, its essential parts may be produced cheaply; and the locking teeth may easily be applied in one working operation. Owing to the staggered arrangement of the ratchets each ratchet may be made with relatively coarse teeth, and yet a fine regulation may still be attained.

According to a further feature of the invention, the ratchets are arranged symmetrically with respect to the direction of displacement of the tension member of the device, and the spring pawls are produced from one single stamping. This results in a simple, inexpensive and space-saving arrangement whilst enabling as few parts as possible to be used.

Further details and features of the invention will be apparent from the following description of an embodiment as illustrated in the accompanying drawings, in which.

Figure 1:
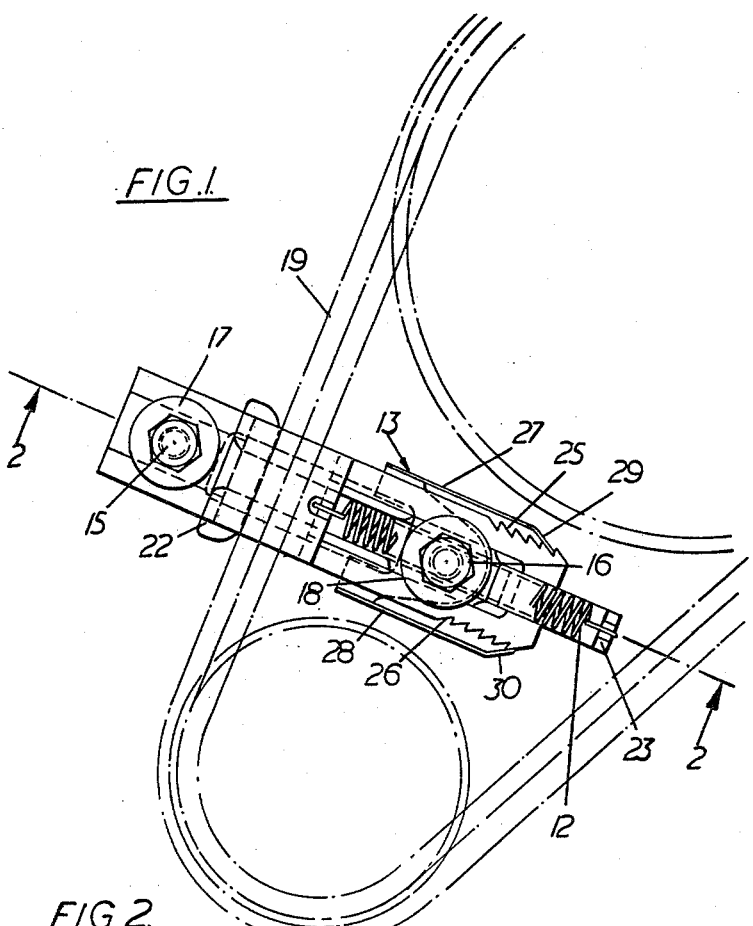
FIGURE 1 is a plan of a chain tightener according to the invention.

The chain tightener shown in the drawings consists essentially of a guide member 10, a slide member 11, a tension spring 12 and spring pawls 13. The guide member 10 and slide member 11 are of elongate form and are made as sheet-metal stampings, the member 11 being slidably engaged with the guide member 10.

Figure 2:
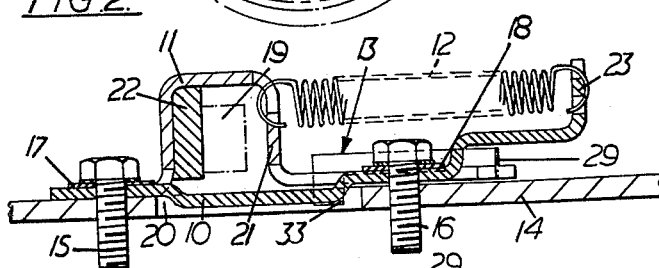
FIGURE 2 is a section on the line 2—2 of FIGURE 1.

The chain tightener is shown in FIGURES 1 and 2 in position for use mounted on a fixed wall 14 by screws 15 and 16 having washers 17 and 18. The wall 14 forms part of an apparatus which also includes sprockets and a chain 19. In the region of the chain 19, the guide member 10 is downwardly offset and is accommodated in a slot 20 in the wall 14.

The washers 17 and 18 also serve to maintain the two members 10 and 11 in correct slidable engagement. As is best shown in FIGURE 2 the slide member 11 is slotted at each end part, the screws 15 and 16 being accommodated in the slots. The slide member 11 is made of slightly thinner metal than the guide member 10 so that there is clearance between the member 11 and the washers 17 and 18, which extend beyond the slotted parts of the slide member 11 on each side thereof to retain it slidably against the guide member 10.

As shown in FIGURE 1, the slide member 11 is formed with an inverted U-shaped portion 21 in which is secured a chain jockey in the form of a rubber pad 22 adapted to rest against the drive chain 19, the latter being accommodated in the U-shaped portion 21. The spring 12 is attached at one end to an upwardly bent end 23 of the guide member 10 and, at its other end, to the U-shaped portion 21 of the tension member 11.

The member 11 has ratchets 25 and 26 formed respectively, on the sides of member 10. The teeth of one ratchet are staggered longitudinally with respect to those of the other by half a tooth.

Figure 3:
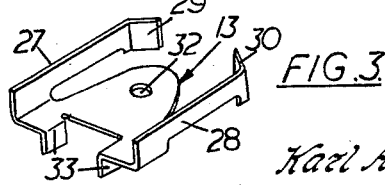
FIGURE 3 is a perspective view of spring pawls forming part of the chain tightener.

The ratchets 25 and 26 are engaged by spring pawls 27 and 28, having inwardly inclined ends 29 and 30. The pawls 27 and 28 form integral parts of a single stamping 13, as shown in FIGURE 3, having a web 31 provided with a hole 32, through which the screw 16 passes. The stamping 13 also has downwardly bent lugs 33 which bear against the sides of the slot 20 to prevent the stamping from turning.

The chain tightener operates as follows:

The spring 12 pulls the member 11 and the rubber pad 22 towards the chain 19. If for any reason the chain slackens, member 11 slides to the right, as shown in FIGURE 2, and is prevented from moving in the opposite direction by engagement of one of the pawl ends 29, 30 with a tooth of one of the ratchets 25, 26.

We claim:
1. A chain tightener comprising in combination:
 (a) an elongate guide member adapted to be secured to a fixed support,
 (b) an elongate slide member having opposite end portions thereof longitudinally slotted and slidably engaged with opposite longitudinal edges of said guide member, and having intermediate its ends a U-shaped portion,
 (c) a chain jockey carried by one leg of said U-shaped portion,
 (d) a tension spring connected at its opposite ends respectively to said slide member and one end of said guide member to bias said slide member in one direction of its movement,
 (e) a plate member secured with said guide member to said support,
 (f) said plate and slide members having elements thereon co-operating to form a ratchet mechanism to prevent movement of said slide member opposite to said one direction,
 (g) each of said members being formed as a sheet metal stamping.
2. A chain tightener comprising in combination:
 (a) an elongate guide member adapted to be secured to a fixed support,
 (b) an elongate slide member having opposite end por- tions thereof longitudinally slotted and slidably engaged with opposite longitudinal edges of said guide member, and having intermediate its ends a U-shaped portion,
(c) a chain jockey carried by one leg of said U-shaped portion,
(d) a tension spring connected at its opposite ends respectively to said slide member and one end of said guide member to bias said slide member in one direction of its movement,
(e) a plate member secured with said guide member to said support,
(f) said plate and slide members having thereon elements which co-operate to form a spring pawl and ratchet mechanism to prevent movement of said slide member opposite to said one direction,
(g) each of said members being formed as a sheet metal stamping.

3. A chain tightener comprising in combination:
(a) an elongate guide member adapted to be secured to a fixed support,
(b) an elongate slide member having opposite end portions thereof longitudinally slotted and slidably engaged with opposite longitudinal edges of said guide member, and having intermediate its ends a U-shaped portion.
(c) a chain jockey carried by one leg of said U-shaped portion,
(d) a tension spring connected at its opposite ends respectively to said slide member and one end of said guide member to bias said slide member in one direction of its movement,
(e) a plate member secured with said guide member to said support,
(f) said plate member having integral resilient pawls and said slide member having integral ratchet teeth which co-operate with said pawls to form a ratchet mechanism to prevent movement of said slide member opposite to said one direction,
(g) each of said members being formed as a sheet metal stamping,
(h) said ratchet teeth being formed on opposite longitudinal edges of said slide member with the teeth on one side displaced longitudinally by half one tooth space relative to the teeth on the other side.

4. In combination with apparatus including a fixed wall and a drive chain adjacent said wall:
(a) an elongate guide member fixed by screws at either end thereof to said wall,
(b) a slide member having at each end thereof a longitudinal slot the walls of which are slidably engaged with opposite longitudinal edges of the guide member so that said slide member can slide on said wall and longitudinally of said guide member,
(c) said slide member having intermediate its ends an inverted U-shaped portion,
(d) a chain jockey comprising a pad secured to one leg of said U-shaped portion, said U-shaped portion straddling said chain,
(e) a tension spring connected at its opposite ends respectively to said slide member and one end of said guide member so as to bias said slide member in one direction of movement to engage said pad with said chain and tension said chain,
(f) a plate member secured to said wall and to said guide member by one of said screws,
(g) said plate member and slide member having formations thereon respectively co-operating to form a ratchet mechanism to permit movement of said slide member in said one direction but prevent movement in the other direction, and
(h) each of said members being formed as a sheet metal stamping.

5. In combination with apparatus including a fixed wall and a drive chain adjacent said wall;
(a) an elongate guide member fixed by screws a either end thereof to said wall,
(b) a slide member having at each end thereof a longitudinal slot the walls of which are slidably engaged with opposite longitudinal edges of the guide member so that said slide member can slide on said wall and longitudinally of said guide member,
(c) said slide member having intermediate its ends an inverted U-shaped portion,
(d) a chain jockey comprising a pad secured to one leg of said U-shaped portion, said U-shaped portion straddling said chain,
(e) a tension spring connected at its opposite ends respectively to said slide member and one end of said guide member so as to bias said slide member in one direction of movement to engage said pad with said chain and tension said chain,
(f) a plate member including a pair of integral spring pawls secured to said wall and to said guide member by one of said screws,
(g) ratchet teeth integral with said slide member on opposite longitudinal edges thereof, said teeth co-operating with said pawls to form a ratchet mechanism to prevent movement of said slide member against the bias of said spring,
(h) each of said members being formed as a sheet metal stamping, and
(i) washers carried by said screws and overlying the slotted portions of said slide member to retain the slide member in slidable engagement with the guide member.

6. The combination claimed in claim 5, in which said slide member is of sheet metal of thinner section than said guide member so as to facilitate slidable movement of said slide member.

7. The combination claimed in claim 6, in which the portion of the guide member underlying the jockey is downwardly offset and located in a slot in said wall.

8. The combination claimed in claim 7 in which said plate member has integral down-turned lugs which engage the side of the slot in the wall to locate said plate member.

9. A chain tightener comprising in combination:
(a) a guide member,
(b) a member slidable thereon having a U-shaped portion to straddle the chain,
(c) a rubber chain jockey secured in the U-shaped portion,
(d) each said member being in the form of a sheet metal stamping,
(e) a tension spring fastened at its ends, respectively, to the members, and
(f) ratchets formed integrally on the slidable member engaged by spring pawls on the guide member to prevent movement of the slidable member in the direction against the action of the spring,
(g) said pawls being formed as integral parts of a sheet metal stamping attached to the guide member.

10. In combination with apparatus including a fixed wall and a drive chain adjacent the wall:
(a) a chain tightener comprising a fixed guide member mounted on the fixed wall,
(b) said guide member being mounted on the wall by means of screw passing through the guide member and washers overlying the guide member,
(c) a slide member having slotted end portions to receive the guide member, slidably retained on the guide member between the fixed wall and the washers, said washers also overlying the slidable member,
(d) a chain jockey carried by said slide member,
(e) a tension spring fastened at its ends to said members so as resiliently to press the chain jockey aginst the chain, and
(f) mechanism to prevent movement of the slidable member in the direction opposite to that of the resilient bias comprising ratchets formed on the slide member engaged, respectively, by spring pawls on the guide member, (g) said spring pawls forming integral parts of a sheet metal stamping fastened to the guide member by one of the screws 11. The combination according to claim 10 in which the apparatus includes sprockets, drivably connected by the chain and in which the members have major portions within the space defined by the fixed wall, chain and sprockets.

References Cited in the file of this patent

UNITED STATES PATENTS

| | | |
|---|---|---|
| 1,806,902 | Hawley | May 26, 1931 |

FOREIGN PATENTS

| | | |
|---|---|---|
| 353,797 | Great Britain | July 30, 1931 |
| 696,586 | Great Britain | Sept. 2, 1953 |